(12) United States Patent
Laswell et al.

(10) Patent No.: US 10,367,830 B2
(45) Date of Patent: Jul. 30, 2019

(54) SECURITY ACTION OF NETWORK PACKET BASED ON SIGNATURE AND REPUTATION

(71) Applicant: Trend Micro Incorporated, Tokyo (JP)

(72) Inventors: Matthew Laswell, Austin, TX (US); James Rolette, Austin, TX (US)

(73) Assignee: TREND MICRO INCORPORATED, Tokyo (JP)

( * ) Notice: Subject to any disclaimer, the term of this patent is extended or adjusted under 35 U.S.C. 154(b) by 320 days.

(21) Appl. No.: 15/164,739

(22) Filed: May 25, 2016

(65) Prior Publication Data

US 2016/0269430 A1 Sep. 15, 2016

Related U.S. Application Data

(63) Continuation of application No. PCT/US2013/072819, filed on Dec. 3, 2013.

(51) Int. Cl.
*H04L 29/06* (2006.01)
*H04L 12/26* (2006.01)

(52) U.S. Cl.
CPC .......... *H04L 63/1416* (2013.01); *H04L 63/00* (2013.01); *H04L 63/0245* (2013.01); *H04L 63/1441* (2013.01); *H04L 43/028* (2013.01); *H04L 63/20* (2013.01)

(58) Field of Classification Search
CPC ............. H04L 63/1416; H04L 63/0227; H04L 63/126; H04L 47/32; H04L 63/1441; H04L 47/2441; H04L 69/22; H04L 63/00; H04L 63/0245; H04L 51/12; H04L 63/0236; H04L 67/327; H04L 67/306; H04L 67/2819; H04L 63/068; G06F 21/55; G06F 7/00; G06F 15/16; G06F 11/00; G06F 21/00; G06Q 10/107
USPC .............. 726/11, 13-14, 22-25; 707/999.01; 709/206-207
See application file for complete search history.

(56) References Cited

U.S. PATENT DOCUMENTS

| | | | |
|---|---|---|---|
| 7,792,909 B2 * | 9/2010 | Lund .................... | G06Q 10/107 709/206 |
| 8,370,407 B1 | 2/2013 | Devarajan et al. | |
| 9,043,909 B2 * | 5/2015 | Thomas .............. | H04L 63/0227 726/11 |
| 9,106,680 B2 * | 8/2015 | Alperovitch ............ | H04L 63/14 |
| 2005/0234915 A1 * | 10/2005 | Ricciulli ............. | H04L 47/2441 |
| 2008/0082662 A1 | 4/2008 | Dandliker et al. | |
| 2010/0095367 A1 | 4/2010 | Narayanaswamy | |
| 2013/0139245 A1 | 5/2013 | Thomas | |
| 2013/0298243 A1 | 11/2013 | Kumar et al. | |
| 2014/0259140 A1 * | 9/2014 | Subramanian .......... | H04L 63/02 726/11 |

* cited by examiner

*Primary Examiner* — Thanhnga B Truong
(74) *Attorney, Agent, or Firm* — Okamoto & Benedicto LLP

(57) ABSTRACT

Example embodiments disclosed herein relate to perform a security action, (e.g., filtering) based on reputation and a signature match. A reputation is determined of a devices associated with a network packet or network packet stream. It is determined whether a signature matches the network packet or an associated flow of the network packet. The security action is determined based on the reputation and the match.

15 Claims, 3 Drawing Sheets

SECURITY ACTION OF NETWORK PACKET BASED ON SIGNATURE AND REPUTATION

CROSS-REFERENCE TO RELATED APPLICATION

This application is a continuation of International Application No. PCT/US2013/072819, with an International Filing Date of Dec. 3, 2013, which is incorporated herein by reference in its entirety.

BACKGROUND

Security providers and manufacturers are challenged to deliver quality and value to consumers, for example, by providing a secure networking environment. Packet inspection devices can be deployed in a network to inspect content of data packets communicated through the network. When used to apply network security, packet inspection technology is employed at multiple protocol layers to identify suspicious or malicious packets. In other examples, packet inspection can also be applied in other fields.

BRIEF DESCRIPTION OF THE DRAWINGS

The following detailed description references the drawings, wherein.

DETAILED DESCRIPTION

Figures 1, 2:
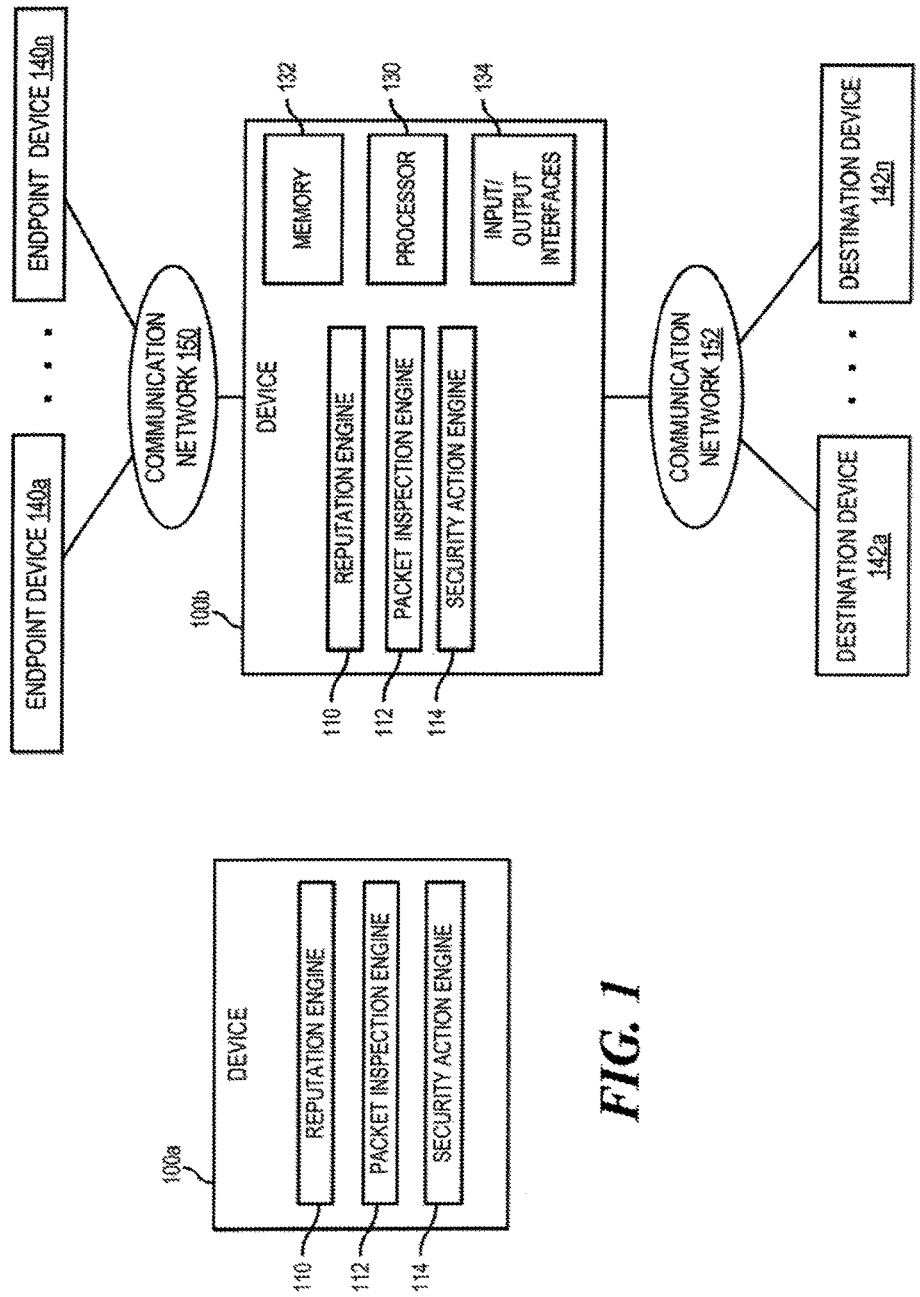
FIGS. 1 and 2 are block diagrams of computing systems capable of performing a security action based on a signature match and reputation, according to various examples.

Technologies can be used to protect an entity such as an individual, enterprise, etc. from unwanted malicious activity. Intrusion prevention devices can be network security appliances that can be used to monitor network and/or system activities for malicious activity. Network security devices face challenges to detect attacks in traffic from a wide variety of applications, file types, protocols, and services. Detecting these may rely on detailed knowledge of not only the application or file type, but also the attack vector being used.

An inline intrusion prevention device potentially may be used to parse file types, such as Portable Document Format (PDF) for ADOBE, documents from Microsoft Word, Java code from a variety of developers, etc. The device may also benefit from knowledge of the vulnerabilities in a variety of endpoint applications in order to detect attempts to exploit those vulnerabilities. This can be computationally expensive and can increase engineering commitment to keep working properly. In turn, these challenges represent limits on type types of attacks that a network security can detect.

Moreover, there is a knowledge gap between researchers that develop security updates for products to keep up with trends, hackers, and latest attack mechanisms and zero-day attacks. Thus, network security devices can have holes in its knowledge base.

Accordingly, various embodiments disclosed herein relate to an approach to bridge the knowledge gap. What is proposed is a mechanism by which a network security device can combine both deep packet inspection and endpoint reputation in order to provide its user(s) with a more effective and more expressive security policy, protect against previously-unknown attack vectors, and reduce computational load on a network security device. Deep packet inspection information can be combined with endpoint reputation information to produce a security policy to create a more effective security policy.

Without this technique, for example, a network administrator could instantiate deep packet inspection policies to detect and block Java downloads. However such an approach isn't very useful because Java downloads are used in many legitimate applications. The network administrator could alternatively instantiate reputation policies to block all network access from Internet Protocol (IP) addresses that are known to have poor reputation. This approach is useful, but it's limited because the administrator risks blocking legitimate traffic.

With the approaches described herein, the administrator is able to instantiate policies that can use endpoint reputation in combination with deep packet inspection to create a more powerful tool. Deep inspection filters are augmented through the use of reputation information. As such, a filter that previously said "don't allow java downloads" can now say "don't allow java downloads from addresses that are known to distribute malware."

Packet inspection can involve examining the content of a packet or stream of packets, where the examined content includes the payload of the packet, and possibly the header of the packet. A "packet" can refer to any type of data unit that is used for carrying data between electronic devices. As examples, a packet can include an IP packet, an Ethernet frame, or any other type of data unit. Further, inspection of a packet may be part of a greater inspection of a stream of packets that the packet is associated with. Moreover, a packet stream may include one or more packets.

Examining the content of a packet can be performed for various purposes, including security purposes (e.g. to identify or block unauthorized intrusion, to detect or block malware such as a virus or worm, to detect or block spam, to detect protocol non-compliance, to control an application, and so forth). Packet inspection to detect protocol non-compliance seeks to identify data that does not conform or comply with one or multiple standards. Packet inspection for controlling an application can involve preventing execution or allowing execution of the application, based on one or multiple criteria.

The approaches described herein allow for augmenting filters with qualifiers based on the reputation. The resulting enhanced filter can therefore apply a particular security policy selectively depending on the reputation of the endpoint. For example, as noted above, an administrator can block the download of Java code from endpoints that have a reputation for serving up malware. Moreover, the intrusion prevention system can still allow other, less threatening traffic from those endpoints, and can still allow Java download from websites which have a good reputation.

A set of primitives can be used to describe dangerous traffic. In addition to typical deep packet inspection primitives, that might describe the content of some type of traffic, reputation primitives can be included that allow the specification of reputation data concerning the endpoint. While the deep packet inspection primitives describe some set of network content at layers 2-7, the reputation primitives describe information about the endpoint or source of the content. The reputation information can include metadata about the endpoint (e.g., is it a source of junk emails? Malware? Is it part of a botnet?, etc.) and/or a reputation score, which indicates the overall reputation of the endpoint (0=perfectly good, 100=source of much malware). Various approaches, such as scores, can be used to implement the reputation. When the network security device inspects a flow of traffic, it evaluates it against both sets of primitives in order to determine whether or not the flow should be allowed or blocked.

In some examples, the precise limits placed on endpoint reputation are modifiable and controllable by an administrator of the network security device. For example, a configuration can be set up in a manner such that the administrator can choose, for a particular file type, protocol, service, application, etc., a threshold reputation for a source that if a particular comparison matches (e.g., a score greater than the threshold). If the match occurs, then, a security action is performed. Examples of security actions may include filtering the packet, filtering a stream associated with the packet, allowing the packet to pass, allowing an associated stream of packets to pass, allowing a part of the stream to pass, performing a more in depth analysis on the packet and/or packet stream, etc.

FIGS. 1 and 2 are block diagrams of computing systems capable of performing a security action based on a signature match and reputation, according to various examples. Devices 100a, 100b include components that can be utilized to determine and/or perform a security action based on a reputation of an entity and a signature match. The respective devices 100a, 100b may be implemented as a computing device such as a notebook computer, a desktop computer, a server, a workstation, etc., as a network device, such as an intrusion prevention system, or any other computing device or system such as a disaggregated system that is capable of performing the functionality described herein. In certain examples, systems can include one or more device that can determine reputation and one or more other devices performing deep packet inspection. In certain examples, as shown in FIG. 2, the device 100 is an inline device between an endpoint device 140a-140n and a destination device 142a-142n. In some examples, the destination devices 142 can be considered one or more devices that the device 100 is to protect from network traffic.

The device 100 can include a reputation engine 110 and/or module, a packet inspection engine 112 and/or module, and a security action engine 114 and/or module. The engines 110, 112, 114 include hardware and/or combinations of hardware and programming to perform functions provided herein. Moreover, the modules (not shown) can include programming functions and/or combinations of programming functions to be executed by hardware as provided herein. When discussing the engines and modules, it is noted that functionality attributed to an engine can also be attributed to the corresponding module and vice versa. Moreover, functionality attributed to a particular module and/or engine may also be implemented using another module and/or engine.

The reputation engine can be used to determine a reputation of an entity associated with a network packet. In some examples, the entity can be one of the endpoint devices 140a-140n, a user of the respective device, etc. The entity can communicate with the device 100 via a communication network 150. The network packet and/or a network packet stream including the network packet can be associated with a destination device 142a-142n, which can be communicatively connected to the device 100 via another communication network 152. With this approach, network communication goes through the device to connect the devices. The entities reputation can be based on information about the entity, for example, a reputation associated with an IP address of the entity, domain name of the entity, SSL Certificates, file instances, or the like. Further, the entity can be a user of the endpoint device 140 and the reputation can be of an account of the user or other activity of the user/entity.

The determination can be via a query and response to a server, from information stored at the device in memory 132, by processing events to determine the reputations, etc. In one example, the information for the determination can come from a security intelligence feed from a global reputation database, such as a malware repository, open source black lists, $3^{rd}$ party commercial sources, etc. The reputation can be in the form of a score where one end represents that the entity is associated with malware (e.g., spyware, worms, spam, phishing emails, Trojans, etc.). The other end can represent that there is no known bad information about the entity, in certain examples. In some examples, the reputation score can be used to perform a security action, such as filtering the packet or stream of packets without using packet inspection (e.g., if the reputation is above a set threshold), quarantining, blocking, etc.

In other examples, the packet inspection engine 112 can be used to determine whether a signature matches the network packet or associated network flow of the network packet. In one example, the packet inspection can look for known code and/or known patterns. The known information can be stored in a database and fingerprinting/hashing can be used to determine the code/patterns of activity. The database can be local to the device 100 and/or remote and updated in memory 132. The patterns can be determined at the device and/or be provided (e.g., via a service). The matching can be signature-based and as such, packets in the network are monitored and compared with pre-configured pre-determined attack patterns known as signatures. The signatures can be a partial or full match of malware such as a virus, spam, Trojans, etc. Moreover, in some examples, header information of the packet(s) can be used to understand a context of the packet(s). This information (e.g., a determination of a file type, of a network usage type, protocol usage, an associated program or services, etc.) can be used for the signature matching.

In one example, when the signature matches, the security action engine 114 determines a security action based on the reputation associated with the packet/stream and the match. In one example, one or more signature matches can be associated with a reputation correlation. For example, if the signature matches and the reputation is in a first range, a first action is taken, if the reputation is within a second range, a second action is taken, if the reputation is within a third range, a third action is taken, etc. A mapping or table look-up can be used to determine the action. In certain examples, the security action can include at least one of allowing the packet to pass, allowing an associated stream of packets to pass, filtering out the packet, filtering out the stream of packets, and performing a more in-depth analysis. As such, the security action engine 114 can be used to filter out the network packet and/or a stream associated with the packet if the match occurs and the reputation is in the associated range.

In one example, there may be two ranges based on a comparison to a threshold. For example, above or equal to the threshold can lead to the first range and below the threshold can lead to the second threshold. Other operators can be used to determine the range/thresholds. If the security action was filtering, the security action engine 114 can filter the packet and/or associated stream of packets.

In another example, usage of the reputation can occur during the matching of the signature. For example, the signatures can include the reputation correlation when the signatures are matched. As such, the filed values of the signature to be matched along with the range or other comparison based decision can be used to associate the match to a security action. The security action can then be performed.

To illustrate, in one example, the signature match can be based on a file application, a network use type, etc. The file application, the network use type, etc. can be associated with at least one exploit. A rule can be used such that if the file application (e.g., a JAVA program, a PDF, etc.) or network use type (e.g., movie stream) is used, reputation based filtering can occur. The file application can be determined based on a file type or executable associated with the application. The file type can be a complex document, such as a PDF or MICROSOFT WORD document and/or an executable/script (e.g., a *.exe, a *.jar, a *.js, etc.).

Different reputations can be used as well. For example, a type of malware can be used can be associated with varying reputation scores. Multiple such score types can be processed and used in correlations. Metadata about the type of malware can be used in the associations. In one example, the file type is an FLASH document and the reputation information is of a source. The source has a general reputation of X which is of a middle threat level, a spam associated reputation of Y—a middle threat level, and a FLASH malware reputation of Z—of little or no known threat. The general reputation and/or FLASH malware reputation may be used in this case. Further, both may be used in the determination (e.g., a more threat general reputation may lower a required FLASH malware reputation to cause a filter security action). Access can be provided to an administrator to configure the signature matches and/or reputation usage.

A processor 130, such as a central processing unit (CPU) or a microprocessor suitable for retrieval and execution of instructions and/or electronic circuits can be configured to perform the functionality of one or more of the engines 110, 112, 114 or modules described herein. Moreover, as used herein, "logic" is an alternative or additional processing resource to perform a particular action and/or function, etc., described herein, which includes hardware, e.g., various forms of transistor logic, application specific integrated circuits (ASICs), gate arrays, etc., as opposed to computer executable instructions, e.g., software firmware, etc., stored in memory and executable by a processor.

In certain scenarios, instructions and/or other information can be included in memory 132 or other memory. Input/output interfaces 134 may additionally be provided by the computing device 100*b*. For example, input devices, such as a keyboard, a sensor, a touch interface, a mouse, a microphone, etc. can be utilized to receive input from an environment surrounding the computing device 100*b*. Further, an output device, such as a display, can be utilized to present information to users (e.g., for administrator use). Examples of output devices include speakers, display devices, amplifiers, LEDs, etc. Moreover, in certain embodiments, some components can be utilized to implement functionality of other components described herein. Input/output devices such as communication devices like network communication devices or wireless devices can also be considered devices capable of using the input/output interfaces 134.

Each of the modules may include, for example, hardware devices including electronic circuitry for implementing the functionality described herein. In addition or as an alternative, each module may be implemented as a series of instructions encoded on a machine-readable storage medium of device and executable by processor 130. It should be noted that, in some embodiments, some modules are implemented as hardware devices, while other modules are implemented as executable instructions.

The communication networks 150, 152 can use wired communications, wireless communications, or combinations thereof. Further, the communication networks 150, 152 can include multiple sub communication networks such as data networks, wireless networks, telephony networks, etc. Such networks can include, for example, a public data network such as the Internet, local area networks (LANs), wide area networks (WANs), metropolitan area networks (MANs), cable networks, fiber optic networks, combinations thereof, or the like. In certain examples, wireless networks may include cellular networks, satellite communications, wireless LANs, etc. Further, the communication networks 150, 152 can be in the form of a direct network link between devices. Various communications structures and infrastructure can be utilized to implement the communication network(s).

By way of example, the devices communicate with each other and other components with access to one or more communication networks via a communication protocol or multiple protocols. A protocol can be a set of rules that defines how nodes of the communication networks interact with other nodes. Further, communications between network nodes can be implemented by exchanging discrete packets of data or sending messages. Packets can include header information associated with a protocol (e.g., information on the location of the network node(s) to contact) as well as payload information.

Figures 3, 4:
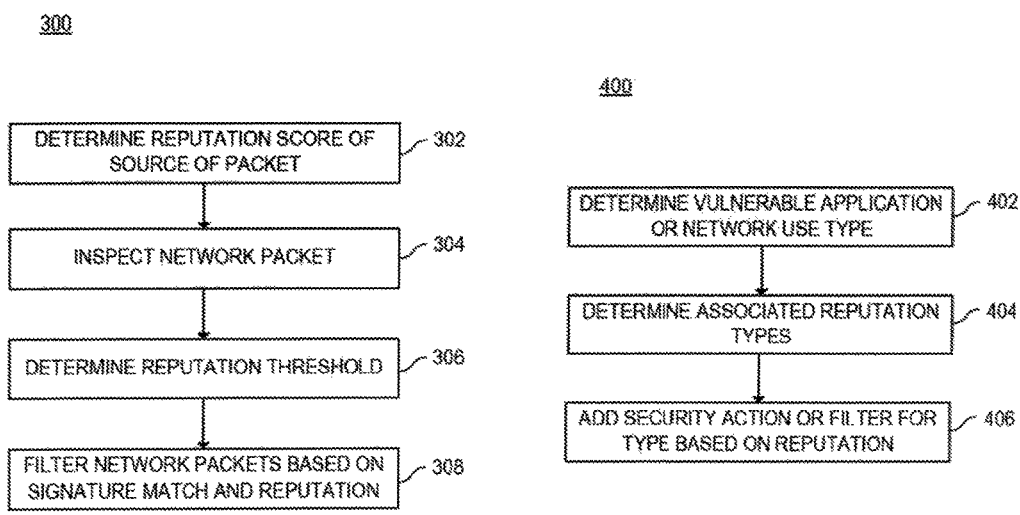
FIG. 3 is a flowchart of a method for filtering network packets based on a reputation and a signature match, according to one example.
FIG. 4 is a flowchart of a method for adding a filter for a file type based on reputation, according to one example.

FIG. 3 is a flowchart of a method for filtering network packets based on a reputation and a signature match, according to one example. Although execution of method 300 is described below with reference to device 100, other suitable components for execution of method 300 can be utilized (e.g., device 500). Additionally, the components for executing the method 300 may be spread among multiple devices (e.g., multiple intrusion prevention appliances parallel to the device and in-line with respect to communication of network packets). Method 300 may be implemented in the form of executable instructions stored on a machine-readable storage medium, such as storage medium 520, and/or in the form of electronic circuitry.

At 302, the reputation engine can determine a reputation score of a network packet based on a source or destination of the network packet. As noted above, the reputation score can be retrieved from a memory, a database, from external storage, based on a subscription service, etc. Further, the reputation score can be for an Internet Protocol (IP) address and/or domain name. Other types of reputation can also be used as discussed above. If the reputation score indicates malware past a threshold level, in certain examples, the packet and/or stream associated with the packet can be filtered.

At 304, the packet inspection engine 112 inspects the network packet to determine whether a signature matches the network packet or an associated flow of the network packet. As such, information about the stream can be kept or analyzed to determine the signature match. In one example, the signature can be associated with a file type or application. Moreover, the file type can be a complex document, an executable, combinations thereof, etc.

At 306, the device 100 can determine a reputation threshold associated with a matched signature. As noted above, this can be based on a mapping, table lookup, etc.

Then, at 308, the security action engine 114 can filter the network packet based on a comparison of the reputation score is with the reputation threshold and the signature match. Moreover, packets in a data stream associated with the network packet can also be filtered based on the determination.

As noted above, the signature match can use information in a header or other part of the packet to determine an associated file type or application. That file type and/or application can have one or more reputation thresholds or ranges associated with them. The signature match and comparison can lead to a particular security action (e.g., filtering of the packet or stream) to implement. Then, the security action can be implemented.

FIG. 4 is a flowchart of a method for adding a security action or filter for a file, application, or network use type based on reputation, according to one example. Although execution of method 400 is described below with reference to device 100, other suitable components for execution of method 400 can be utilized (e.g., device 500). Additionally, the components for executing the method 400 may be spread among multiple devices (e.g., multiple intrusion prevention appliances parallel to the device and in-line with respect to communication of network packets). Method 400 may be implemented in the form of executable instructions stored on a machine-readable storage medium, such as storage medium 520, and/or in the form of electronic circuitry.

At 402, a device can determine a vulnerable application, network use type, file type, etc. The device can receive information about the vulnerability from input (e.g., via a keyboard input, a communication from a server or database, etc.). The vulnerability can also be known to an administrator that provides the information to the device via a communication method.

At 404, the device can determine associated reputation types for the vulnerability. For example, reputation may be associated with malware in general, spam, JAVASCRIPT vulnerabilities, phishing, etc. For one or more of the vulnerability reputation types, a threshold comparison result and/or range can be associated with the application, network use type, etc. Moreover, a security action or filter can be added for the reputation type for the vulnerability (406). In these examples, one or more matches for the vulnerability using signature matching can lead to the usage of the reputation and/or security action.

With the approaches provided herein, a more granular and powerful security policy can be implemented. Moreover, a network security administrator can allow applications to flow unhindered through the network generally, while preventing various classes of network traffic from flowing to/from known bad endpoints. Further, this can allow for protection against previously unknown attack vectors because the device can block traffic based on the application/network traffic type and the endpoint reputation. This allows for the device to block classes of zero-day attacks without need to recognize the specific attacks.

Moreover, the approach can be computationally cheaper than doing a full deep-packet inspection on each packet. Rather than breaking a complex flow of network traffic down to its parts and doing a search for various attacks, in certain examples, the device can detect the type of traffic and reputation of the endpoint/entity.

Additionally, the reputation service can be enhanced. A user/administrator may not be comfortable blocking all traffic from particular endpoints with a middle of the road reputation, but the user/administrator may be more comfortable blocking highly sensitive traffic (e.g., because it may be associated with a likely attack vector or because it may include exfiltrated information).

Figure 5:
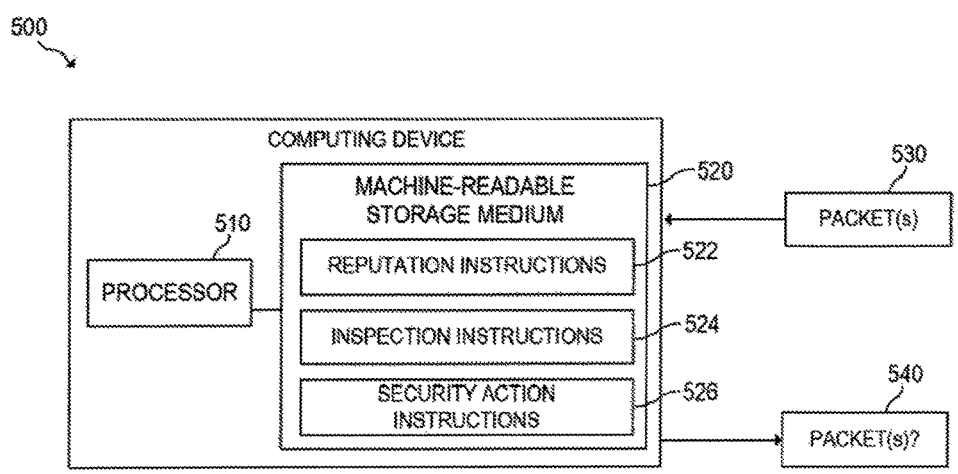
FIG. 5 is a block diagram of a computing device capable of performing security actions based on inspection matching and reputation, according to one example.

FIG. 5 is a block diagram of a computing device capable of performing security actions based on inspection matching and reputation, according to one example. The computing device 500 includes, for example, a processor 510, and a machine-readable storage medium 520 including instructions 522, 524, 526 for performing a security action on a network packet or packet stream associated with a network packet based on a comparison of a reputation score of an IP address and/or domain name and a threshold associated with a matched signature. Computing device 500 may be, for example, an intrusion prevention system, a server, a network device, a workstation, or other computing device capable of performing the functionality described herein.

The computing device 500 can be placed in-line between two endpoints. A packet stream 530 can be received from one endpoint and can be sent as packet stream 540 to the second endpoint. As noted above, a packet stream may include one or more packets. When the packet stream 530 is received, reputation instructions 522 can be executed to determine a reputation score of the network packet based on an IP address, a domain name, combinations thereof, etc. associated with the network packet stream 530. The reputation score can represent a scale of known maliciousness. As noted above, the known maliciousness score can be retrieved from a database or service. In some examples, the reputation score can be of a specialized type for a particular type of unwanted maliciousness (e.g., Trojan, spam, etc.).

The inspection instructions 524 can be executed to inspect the network packet to determine whether a signature matches the network packet. As noted above, the signature determination can be via various approaches, such as determining a network traffic type, application type, and/or file type associated with the packet stream 530. Moreover, the respective type can be determined, in some examples, by examining a header of the packet stream 530. In one example, the signature is associated with a type that is at least one of a complex document and an executable.

Security action instructions 526 can be executed to determine a reputation threshold associated with the signature. The threshold can be associated with one or more types of reputations. Metadata associated with the network packet stream 530 based on the IP address, the domain name, or a combination thereof can be used to select a type of reputation to use. Moreover, in some examples, the threshold can be different for the different types when using the same type of reputation. As such, the reputation threshold can be based on the metadata.

A security action can be performed on the network packet stream 530 or a network packet stream associated with the network packet stream 530 based on a comparison of the reputation score and the reputation threshold. The comparison can lead to a Boolean value, yield a value (e.g., a range), etc. The values can be mapped to particular security actions. In one scenario, the security action can be to allow the packet/stream to continue, as packet stream 540. In another scenario, the security action can be to filter the packet/stream.

Further, in some examples, the signature match includes the comparison of the reputation threshold to the reputation score. In these examples, the matching includes the reputation. For example, the signature can be: If match (Network Usage Type==A and Reputation>=80) then, filter the packet/stream. In another example, the signature match can be: If match (Network Usage Type==A and 50<=Reputation<=80) then, do a further inspection. In yet another example, the signature match can be: If match (Network Usage Type==A and Reputation<50) then, allow the packet to continue to destination. Further examples can include the scenario where more than one reputation can be used: If match (Network Usage Type==A and (Trojan Reputation>50 or General Reputation>80)) then, filter packet/stream.

Processor 510 may be, at least one central processing unit (CPU), at least one semiconductor-based microprocessor, at least one graphics processing unit (GPU), other hardware devices suitable for retrieval and execution of instructions stored in machine-readable storage medium 520, or combinations thereof. For example, the processor 510 may include multiple cores on a chip, include multiple cores across multiple chips, multiple cores across multiple devices (e.g., if the computing device 500 includes multiple node devices), or combinations thereof. Processor 510 may fetch, decode, and execute instructions 522, 524, 526 to implement tasks described in methods 300 and/or 400. As an alternative or in addition to retrieving and executing instructions, processor 510 may include at least one integrated circuit (IC), other control logic, other electronic circuits, or combinations thereof that include a number of electronic components for performing the functionality of instructions 522, 524, 526.

Machine-readable storage medium 520 may be any electronic, magnetic, optical, or other physical storage device that contains or stores executable instructions. Thus, machine-readable storage medium may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium can be non-transitory. As described in detail herein, machine-readable storage medium 520 may be encoded with a series of executable instructions for performing the security action based on reputation and a signature match.

What is claimed is:

1. A device comprising a hardware processor and a memory, the memory comprising instructions that, when executed by the hardware processor, cause the device to:
   determine a reputation of an entity associated with a network packet;
   determine whether a signature matches the network packet or associated flow of the network packet, wherein the signature that matches the network packet or associated flow of the network packet is a partial or full match of a malware; and
   determine a security action based on the reputation of the entity associated with the network packet and the signature that matches the network packet or associated flow of the network packet.

2. The device of claim 1, wherein the reputation is of at least one of an Internet Protocol (IP) address and a domain name associated with the network packet.

3. The device of claim 1, wherein the instructions stored in the memory, when executed by the hardware processor, cause the device to filter the network packet.

4. The device of claim 3, wherein the instructions stored in the memory, when executed by the hardware processor, cause the device to filter other packets in a stream associated with the network packet.

5. The device of claim 1, wherein the security action includes filtering the network packet based on a comparison of a threshold associated with the signature that matches the network packet or associated flow of the network packet and the reputation of the entity associated with the network packet.

6. The device of claim 5, wherein the signature that matches the network packet or associated flow of the network packet is associated with a file application or network use type that is known to have at least one exploit.

7. The device of claim 1, wherein the instructions stored in the memory, when executed by the hardware processor, cause the device to compare the reputation of the entity associated with the network packet to a set of reputation threshold ranges to determine an associated threshold range, the threshold ranges are associated with corresponding security actions, and the security action is based on the associated threshold range.

8. A method comprising:
   determining, by a hardware processor, a reputation score of a network packet based on a source or destination of the network packet;
   inspecting, by the hardware processor, the network packet to determine that a signature matches the network packet or an associated flow of the network packet, wherein the signature is a partial or full match of a malware;
   determining, by the hardware processor, a reputation threshold associated with the signature that matches the network packet or the associated flow of the network packet; and
   filtering, by the hardware processor, the network packet based on a comparison of the reputation score is with the reputation threshold and the signature that matches the network packet or the associated flow of the network packet.

9. The method of claim 8, further comprising:
   filtering, by the hardware processor, packets in a data stream associated with the network packet based on the determination,
   wherein the reputation score is for at least one of an Internet Protocol (IP) address and a domain name.

10. The method of claim 8, wherein the signature that matches the network packet or the associated flow of the network packet is associated with a file type that is at least one of a complex document and an executable.

11. The method of claim 10, further comprising:
   adding, by the hardware processor, a new filter rule for the file type to filter network packets that, when examined, have a negative reputation greater than the reputation threshold.

12. A non-transitory machine-readable storage medium storing instructions that, if executed by at least one processor of a device, cause the device to:
   determine a reputation score of a network packet stream based on at least one of an Internet Protocol (IP) address and a domain name associated with the network packet;
   inspect the network packet stream to determine that a signature matches the network packet, wherein the signature is a partial or full match of a malware;
   determine a reputation threshold associated with the signature; and
   perform a security action on the network packet stream associated with the network packet based on a comparison of the reputation score and the reputation threshold.

13. The non-transitory machine-readable storage medium of claim 12, wherein the reputation score represents a scale of known maliciousness.

14. The non-transitory machine-readable storage medium of claim 12, wherein the signature is associated with a type that is at least one of a complex document and an executable, and wherein the signature match includes the comparison of the reputation threshold to the reputation score.

15. The non-transitory machine-readable storage medium of claim 12, wherein the at least one processor is to further cause the device to:
- determine metadata associated with the network packet stream based on the at least one of the IP address and the domain name,
- wherein the reputation threshold can further be based on the metadata.

* * * * *